United States Patent Office
3,564,062
Patented Feb. 16, 1971

3,564,062
PRODUCTION OF NITROALKANOLS
John B. Tindall, Terre Haute, Ind., assignor to Commercial Solvents Corporation, New York, N.Y., a corporation of Maryland
No Drawing. Filed Mar. 15, 1968, Ser. No. 713,289
Int. Cl. C07c 79/18, 89/00
U.S. Cl. 260—635
7 Claims

ABSTRACT OF THE DISCLOSURE

A process for the production of nitroalkanols corresponding to the formula $$R\text{—}\underset{\underset{NO_2}{|}}{CH}\text{—}CH_2OH$$

where R is methyl, ethyl or hydroxymethyl, by adding a mixture of a primary nitroalkane and formaldehyde, to a suspension of a calcium or barium base, adding the resulting mixture to an aqueous solution containing an excess of carbon dioxide, separating the precipitated calcium or barium carbonate thereby producing the nitroalkanol.

BACKGROUND OF THE INVENTION

This invention relates to an improved process for the production of nitroalkanols. In a particular aspect, it relates to an improved process for the production of nitroalkanols corresponding to the formula $$R\text{—}\underset{\underset{NO_2}{|}}{CH}\text{—}CH_2OH$$

where R is methyl, ethyl or hydroxymethyl, by the condensation of a primary nitroalkane and formaldehyde.

Nitroalkanols corresponding to the above formula have many uses. One important use is for the production of the corresponding amino alcohols which also have many uses, such as an emulsifying agent when employed with a fatty acid, such as oleic or stearic. Nitroalkanols in which all the hydrogens on the α-carbon atom have been replaced by —CH$_2$OH groups are readily prepared by reacting a nitroalkane with formaldehyde in the presence of an alkaline catalyst. In this process, the formaldehyde condenses with the nitroalkane by replacing the active hydrogen atoms on the α-carbon atom. This process has been very successful when used for the production of nitroalkanols having more than one hydroxy group because the tendency of such a reaction is for complete replacement of α-hydrogen atoms; but when the process is used for the production of nitroalkanols of the above formula, it has been necessary to use a large excess of nitroalkane. For example, when nitromethane and formaldehyde are reacted in a mole ratio of 1:1 or 1:2, the tendency of the reaction is to form tris(hydroxymethyl)nitromethane leaving an excess of nitromethane in the reaction mixture. Nitroethane and 1-nitropropane behave in a similar manner.

Hass and Vanderbilt, U.S. Pat. 2,139,120, recommended a method for the production of nitroalkanols wherein 0.05 to 0.5%, based on the total weight of the reaction mixture, of an alkaline earth hydroxide was used for the alkaline catalyst. These catalysts reportedly preferentially induced the formation of monohydroxy compounds from primary nitroalkanes when an excess of nitroalkane was used. After the nitroalkanol was formed, the alkaline earth catalyst was precipitated by introducing a slight excess of carbon dioxide into the solution. A single phase system was provided by the use of methanol or ethanol and a reaction temperature up to 50° C. was used. In one embodiment, no alcohol was used and instead the nitroalkane was mixed with an aqueous suspension of the alkaline earth hydroxide until the catalyst dissolved, then the aldehyde was added to the mixture.

The mixture was allowed to stand a number of hours, preferably from 1–3 days, then the catalyst was precipitated by addition of a slight excess of $CO_2$ and the precipitate was removed by filtration.

This method has been very successful, particularly in those nitroalkanols where all of the α-hydrogen atoms are substituted. However, production of monohydroxy derivatives of primary nitroalkanes has continued to be difficult because of the large excess of nitroalkane required.

SUMMARY OF THE INVENTION

It is an object of this invention to provide an improved process for the production of nitroalkanols.

It is another object of this invention to provide an improved process for the production of 2-nitro-1,3-propanediol, 2-nitro-1-propanol, and 2-nitro-1-butanol.

Other objects of this invention will be obvious to those skilled in the art from the disclosure herein.

An improved process has now been discovered for the production of nitroalkanols having a hydrogen atom on the α-carbon atom and corresponding to the formula $$R\text{—}\underset{\underset{NO_2}{|}}{CH}\text{—}CH_2OH$$

where R is methyl, ethyl or hydroxymethyl.

The nitroalkanols are obtained in high purity and good yield by selecting different proportions of reactants and mixing them in a different order than taught by the prior art. The improved process has the important advantage that it eliminates the necessity of employing an excess of primary nitroalkane as in the previous process. The improved process is carried out by forming a reaction mixture wherein the nitroalkane and formaldehyde are in about a 1:1 mole ratio, plus an additional mole of formaldehyde when R is hydroxymethyl, and sufficient lower alkanol is added to provide a single phase solution. The reaction mixture is gradually added to an aqueous suspension of a calcium or barium base with agitation, and when the reaction is determined to be complete, the resulting mixture is incrementally introduced into an aqueous solution containing an excess of carbon dioxide thereby precipitating the calcium or barium as the carbonate. The precipitate is then separated by any suitable means to give a solution of nitroalkanol in high yield.

The steps of adding the reaction mixture to the base and incrementally introducing the resulting mixture into the carbon dioxide solution are important as to order of addition and a departure therefrom is deleterious to yield and purity. The nitroalkanol thereby obtained can be used as is or can be further refined as preferred.

DETAILED DESCRIPTION

According to the process of this invention, the nitroalkane, i.e. a primary nitroalkane of from 1 to 3 carbon atoms, and aqueous formaldehyde solution are mixed in a ratio of about 1 mole of formaldehyde per mole of nitroalkane, except that when R is hydroxymethyl, 2 moles of formaldehyde are used, as set forth above. Sufficient lower alkanol is added to form a homogeneous solution. The lower alkanol is preferably methanol but ethanol, 2-propanol or 1-butanol are also useful.

The calcium or barium base, about 1.0 to about 1.25 equivalent (i.e. about 0.5 to 0.62 mole), preferably about 1.1 to 1.2 equivalents, per mole of nitroalkane is suspended in about 800–1000 ml. of water per mole of nitroalkane. The nitroalkane-formaldehyde solution is added to the base with agitation forming a reaction mixture. Heat is evolved during the addition and it is preferred to control the rate of addition to maintain the temperature at 20° C. to 40° C., preferably 25° C. to 30° C. A cooling means is used when desired, and at high ambient temperature some cooling means is preferred.

After addition of the nitroalkane-formaldehyde mixture to the base is complete, agitation is preferably, but not necessarily, continued for 10–20 minutes to insure complete reaction. The reaction mixture is then incrementally contacted with carbon dioxide solution to precipitate the calcium or barium present in the mixture as calcium or barium carbonate. An excess of carbon dioxide over that required to react with the calcium or barium is maintained throughout the addition step. One method for maintaining an excess is to slowly add the reaction mixture to a comparatively small volume of aqueous carbon dioxide solution through which carbon dioxide is continuously sparged. The rate of addition of the reaction mixture to the carbon dioxide solution is controlled to maintain the pH below 7.0, preferably about 5.9 to 6.1. It is also suitable to conduct this step at elevated pressures of from atmospheric to about 1000 p.s.i.g. or more to provide a higher concentration of carbon dioxide in the solution than is possible at atmospheric pressure and thereby shorten the time required for addition of the reaction mixture.

When addition of the reaction mixture to the carbon dioxide solution is complete, the precipitated calcium or barium carbonate is removed by any suitable means, e.g. by centrifuging or filtration. Preferably, but not necessarily, the solution is then contacted with a cationic ion-exchange resin to remove traces of calcium or barium. Otherwise, the solution is preferably acidified with a suitable acid to a pH of about 3–4. The solution is then preferably concentrated at reduced pressure and at an elevated temperature, e.g. at about 50–65° C. to near dryness. Generally, the crude nitroalkanol contained in the concentrate is suitable for reduction to the alkanol-amine without further purification, but when desired, it can be purified by recrystallization, if a solid, or by cautious distillation at reduced pressure, if a liquid.

The primary nitroalkanes useful in the process of this invention are those having from 1 to 3 carbon atoms, i.e. nitromethane, nitroethane, and 1-nitropropane. Commercial grade materials are suitable.

The formaldehyde used in the process of this invention is suitably provided by the 37% aqueous or the 44% aqueous products of commerce and can be inhibited with methanol or uninhibited. Also, a suitable aqueous solution can be prepared from paraformaldehyde or by passing gaseous formaldehyde into water when either of these two methods is preferred.

The calcium or barium base can be commercial grade calcium oxide, calcium hydroxide, barium oxide or barium hydroxide, or mixtures thereof, and preferably is finely ground to avoid a delay in reaction time. Calcium oxide is generally preferred for reasons of economy.

The carbon dioxide used to precipitate the calcium or barium base can be supplied either from a cylinder of liquid carbon dioxide, from a generator employing Dry Ice as a $CO_2$ source, or carbon dioxide from a combustion source can be employed. It is also contemplated that the calcium or barium carbonate obtained in the process is thermally decompoesd to the oxide and carbon dioxide which are recycled to the process.

The ion exchange resin used to remove the final traces of the calcuim or barium ions is any suitable cation-exchange resin known in the art, e.g. Amberlite resin IR–120 manufactured by Rohm and Haas Co.

The following examples further illustrate the practice of this invention.

EXAMPLE 1

Preparation of 2-nitro-1,3-propanediol

A suspension of 33 g. of calcium oxide in 800 ml. of water was prepared and to it with agitation was added a mixture of 62 g. nitromethane, 20 ml. methanol and 150 ml. of 37% formaldehyde, maintaining the temperature at about 25° C. Agitation was continued for 15 minutes and the mixture was then filtered to remove excess calcium compound (it was assumed that calcium oxide was converted to calcium hydroxide). The filtrate was added slowly to 100–200 ml. of water in a reaction vessel equipped with a gas sparger through which gaseous carbon dioxide from a carbon dioxide cylinder was sparged. The volume of water was selected to be sufficient to cover the spargers. The rate of addition of the filtrate was regulated to maintain the pH of the carbon dioxide solution at about 6. Sparging of $CO_2$ was continued for 15 minutes after addition of the filtrate was complete and air was then sparged for an additional 15 minutes to remove excess carbon dioxide. The solution was filtered to separate the precipitated calcium carbonate. The filter cake was washed with water and the filtrate was passed through a column of Amberlite IR–120 ion exchange resin manufactured by Rohm and Haas Co. to remove traces of calcium ion. The effluent was concentrated at 15 mm. at a temperature of 65° C. Upon cooling, a solid mass of crystals of 2-nitro-1,3-propanediol was obtained. The product was centrifuged to remove additional water. The yield was 94.3%, 11.2% nitrogen, theoretical 11.6%.

The 2-nitro-1,3-propanediol was dissolved in 305 g. of methanol and reduced by hydrogenation in the presence of Raney nickel. 2-amino-1,3-propanediol was obtained in good yield based on the nitromethane.

EXAMPLE 2

The experiment of Example 1 was repeated except that 1020 ml. of 0.402 normal barium hydroxide was substituted for the calcium oxide suspension. A mixture of 25 grams nitromethane, 10 ml. methanol and 60 ml. of 37% formaldehyde was added, maintaining the temperature at 25° C. The solution was agitated for 15 minutes and was then added dropwise into carbon dioxide solution as before. Sparging of carbon dioxide was continued for 15 minutes and the solution was then aerated for another 15 minutes. After filtration the filtrate was passed through an ion-exchange column to remove traces of barium and was then concentrated at 62° C. at 1 mm. pressure. A yield of 83.3% was obtained.

EXAMPLE 3

The experiment of Example 1 was repeated except that a suspension of 61 g. of calcium hydroxide in 1000 ml. of water was substituted for the calcium oxide suspension. A mixture of 92 grams nitromethane, 30 ml. methanol and 225 ml. of 37% by weight formaldehyde was added over a period of 1¼ hours at 25° C. The mixture was agitated for 15 minutes, then added over a period of 1½ hours to 100 ml. of water through which $CO_2$ was sparged. The pH was maintained at 6–7. Passage of carbon dioxide was continued for 15 minutes, followed by sparging of air for 15 minutes. The mixture was filtered and passed through a 1¼ by 10 inch column of Amberlite IR–120 ion exchange resin. The effluent was concentrated at 40° C. at 0.1 mm. pressure to give a yield of 95%.

EXAMPLE 4

Preparation of 2-nitro-1-propanol

A suspension of 33 grams of calcium oxide in 800 ml. of water was prepared. A mixture of 75 g. nitroethane, 75 ml. of 37% formaldehyde and 30 ml. of methanol was added to the suspension keeping the temperature at about 25° C. The reaction mixture was agitated for 15 minutes and dropped into 100 ml. of water through which carbon dioxide was sparged. The sparging was continued for 15 minutes and then air was passed through for 15 minutes. The mixture was filtered and passed through an ion-excange column in the same manner as in Example 3. The filtrate was concentrated at 15 mm. at a temperature of 65° C., and 2-nitro-1-propanol was then distilled at a pressure of 0.5–1 mm. over a temperature range of 74–84° for a yield of 58%. On a duplicate run 6 meq. of sulfuric acid was added before distillation and the yield was 61%.

EXAMPLE 5

Preparation of 2-nitro-1-butanol

One mole of 1-nitropropane and one mole of formaldehyde are mixed together in sufficient methanol to provide a homogeneous solution. The mixture is stirred into an aqueous suspension of 0.5 mole calcium oxide. Stirring is continued for 15 minutes, and it is then poured into carbon dioxide saturated water and processed for 2-nitro-1-butanol, according to the procedure of Example 5. A high yield of 2-nitro-1-butanol is obtained.

I claim:
1. In a process for the production of nitroalkanols represented by the formula

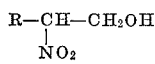

wherein R is methyl, ethyl or hydroxymethyl, by reacting a primary nitroalkane having from 1 to 3 carbon atoms with aqueous formaldehyde in a mole ratio of about 1:1, plus one additional mole of formaldehyde when R is hydroxymethyl, in the presence of lower alkanol and a base selected from the group consisting of calcium oxide, calcium hydroxide, barium oxide, barium hydroxide and mixtures thereof, precipitating the calcium or barium with carbon dioxide to form the carbonate thereof, and separating said calcium or barium carbonate to produce a solution of said nitroalkanol, the improvement consisting of the steps of:
   (a) mixing said nitroalkane and said formaldehyde and sufficient lower alkanol to form a single phase solution,
   (b) gradually adding the resulting mixture with agitation to an aqueous suspension of from 1.0 to 1.25 equivalents based on the nitroalkane of said base in about 800 to 1000 ml. of water per mole of nitroalkane while maintaining a temperature of 20° to 40° C. to effect a reaction thereof, and provide a reaction mixture, and when the reaction is determined to be complete,
   (c) incrementally introducing said reaction mixture into an aqueous solution of carbon dioxide wherein the concentration of said carbon dioxide is maintained in stoichiometric excess of said calcium or barium present in said second reaction mixture, thereby precipitating said calcium or barium base as the carbonate thereof.

2. The process of claim 1 wherein said nitroalkane is nitromethane and the resulting nitroalkanol is 2-nitro-1,3-propanediol.

3. The process of claim 1 wherein said nitroalkane is nitroethane and the resulting nitroalkanol is 2-nitro-1-propanol.

4. The process of claim 1 wherein said nitroalkane is 1-nitropropane and the resulting nitroalkanol is 2-nitro-1-butanol.

5. The process of claim 1 wherein step (c) is effected at a pH of from 5.9 to 6.1.

6. The process of claim 1 wherein the calcium or barium base of step (b) is present in an amount of 1.1 to 1.2 equivalents based on the nitroalkane.

7. The process of claim 1 wherein step (c) is effected at a pressure of from about atmospheric to about 1000 p.s.i.g.

References Cited

UNITED STATES PATENTS 2,139,120  12/1938  Hass et al. _____ 260—635N
2,301,259  11/1942  Cox _____ 260—635N LEON ZITVER, Primary Examiner J. E. EVANS, Assistant Examiner U.S. Cl. X.R.

203—91; 260—584, 637, 638, 643